US009846706B1

(12) United States Patent
Basov et al.

(10) Patent No.: US 9,846,706 B1
(45) Date of Patent: Dec. 19, 2017

(54) MANAGING MOUNTING OF FILE SYSTEMS (71) Applicant: EMC Corporation, Hopkinton, MA (US)

(72) Inventors: Ivan Basov, Brookline, MA (US); William C Davenport, Burlington, MA (US); Sitaram Pawar, Shrewsbury, MA (US); Philippe Armangau, Acton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 242 days.

(21) Appl. No.: 13/730,496

(22) Filed: Dec. 28, 2012

(51) Int. Cl.
G06F 7/00 (2006.01)
G06F 17/00 (2006.01)
G06F 17/30 (2006.01)

(52) U.S. Cl.
CPC .............. G06F 17/30221 (2013.01)

(58) Field of Classification Search
USPC .......... 707/649, 662, 639; 711/162; 714/15; 702/82
See application file for complete search history.

(56) References Cited

U.S. PATENT DOCUMENTS

| 5,893,140 | A * | 4/1999 | Vahalia ............... G06F 11/1435 706/908 |
| 6,076,148 | A * | 6/2000 | Kedem ............... G06F 11/1466 711/162 |
| 6,275,953 | B1 * | 8/2001 | Vahalia et al. .................. 714/11 |
| 6,792,518 | B2 * | 9/2004 | Armangau .......... G06F 11/1469 707/999.202 |
| 6,804,627 | B1 * | 10/2004 | Marokhovsky et al. ..... 702/182 |
| 7,035,881 | B2 * | 4/2006 | Tummala et al. ............ 707/639 |
| 7,177,994 | B2 * | 2/2007 | Galipeau et al. ............ 711/162 |
| 7,870,356 | B1 * | 1/2011 | Veeraswamy et al. ....... 711/162 |
| 7,987,157 | B1 * | 7/2011 | Hsiung et al. ................ 707/649 |
| 8,037,345 | B1 * | 10/2011 | Iyer ..................... G06F 11/1004 714/20 |
| 8,566,371 | B1 * | 10/2013 | Bono ................ G06F 17/30079 707/822 |
| 8,707,018 | B1 * | 4/2014 | Hooker ................. G06F 9/4411 713/1 |
| 8,886,995 | B1 * | 11/2014 | Pallapothu et al. ............ 714/15 |
| 2005/0177539 | A1 * | 8/2005 | Goodwin .......... G06F 17/30067 |
| 2005/0246612 | A1 * | 11/2005 | Leis .................... G06F 11/0727 714/763 |
| 2006/0117172 | A1 * | 6/2006 | Zhang ................... G06F 9/4416 713/2 |
| 2006/0212481 | A1 * | 9/2006 | Stacey ............. G06F 17/30067 |
| 2007/0028110 | A1 * | 2/2007 | Brennan ............... G06F 21/552 713/176 |
| 2008/0134176 | A1 * | 6/2008 | Fitzgerald et al. ............ 718/1 |
| 2009/0182836 | A1 * | 7/2009 | Aviles ................ H04L 41/0893 709/213 |

* cited by examiner

Primary Examiner — Susan Chen
(74) Attorney, Agent, or Firm — Krishnendu Gupta; Deepika Bhayana (57) ABSTRACT A method is used in managing mounting of file systems. A request is received to mount a file system. The request to mount the file system is added in a pending file system mounts queue based on a policy. The file system is mounted in background. Access to the file system is provided before mounting the file system.

20 Claims, 7 Drawing Sheets

MANAGING MOUNTING OF FILE SYSTEMS

BACKGROUND

Technical Field

This application relates to managing mounting of file systems.

Description of Related Art

Computer systems may include different resources used by one or more host processors. Resources and host processors in a computer system may be interconnected by one or more communication connections. These resources may include, for example, data storage devices such as file servers and those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A data storage system, such as a file server, has a number of disk drives for storing files of one or more file systems, and at least one data processor coupled to the disk drives for access to the file systems. The data processor executes various computer programs. Occasionally it becomes necessary to restart execution of the data processor by resetting the data processor. For example, the data processor is reset after its normal sequence of program execution has become disrupted by an error such as a power surge, a program memory failure, and a software bug. Alternatively, a failure of a data processor in a file server may trigger a failover process that transfers functions of the data processor to a standby data processor of the file server in order to provide continuous availability of data to clients connected to the file server. Moreover, the failover process may be triggered due to failures such as a bad disk in a data storage system. Typically, a data processor of a file server executes application programs with the assistance of an operating system program. The reset of the data processor causes a "re-boot" (also referred to as "reboot") of the operating system, followed by the mounting of file systems, and initiation of execution of one or more application programs. If the file server contains a large number of files, it may take a long time (e.g. hundreds of seconds or minutes) before access to data may be restored for clients connected to the file server. During the reboot of the operating system and until files are mounted successfully, clients of the file server are denied access to files in the file server.

SUMMARY OF THE INVENTION

A method is used in managing mounting of file systems. A request is received to mount a file system. The request to mount the file system is added in a pending file system mounts queue based on a policy. The file system is mounted in background. Access to the file system is provided before mounting the file system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing mounting of file systems, which technique may be used to provide, among other things, receiving a request to mount a file system, adding the request to mount the file system in a pending file system mounts queue based on a policy, and mounting the file system in background, wherein access to the file system is provided before mounting the file system.

Generally, a boot configuration file is created for initializing a data processor of a file server and stored on a persistent storage when the file server is configured. A boot configuration file includes bootable objects that are required to execute one or more services or applications on a file server. One or more services or applications running on a file server provide to clients connected to the file server access to data stored in file systems. A bootable object is an object associated with services such as configuration of network devices, network interfaces, storage devices, creation of a file system, creation of a snapshot of the file system, creation of a logical volume and a meta volume required to create the file system, configuration of the logical volume and the meta volume, mounting of the file system, and execution of application services (e.g., NFS 41, CIFS 42). A boot configuration file is recreated from bootable objects either when a data processor of a file server reboots due to a failure, a manual reset of the data processor, or when the data processor fails over to a standby data processor.

Generally, mounting of a file system is a process that enables a user to access files of the file system. Typically, a file system is mounted by a boot configuration file when a file server reboots due to a failure, a manual reset of a data processor of the file server by a user, or when the data processor fails over to a standby data processor in the file server. Further, a file system may also be mounted by a user by executing a mount command to mount the file system. The file system mount process includes reading metadata of a file system from a disk into appropriate in-memory data structures organized in a memory of a storage system.

Generally, a boot configuration file mounts each file system included in the boot configuration file when a data processor of a file server reboots or fails over to a standby data processor of the file server. Conventionally, clients connected to a file server lose access to data of file systems when a data processor reboots or fails over to a standby data processor. In such a conventional system, clients of a file server may need to wait to access data of file systems until the time every file system included in a boot configuration file is mounted on the file server. In such a conventional system, an amount of time required to mount each file system included in a boot configuration file may span, for example, from few seconds to hundreds of seconds based on a number of file systems configured on a file server. Thus, in such a conventional system, clients of a file server may not be able to access data of any one of the file systems until the time each file system of the file server is mounted. Thus, in such a conventional system, mounting of each file system configured on a file sever may take a large amount of time which in turn impacts availability of data of the file server and performance of file server operations such as reboot, system upgrade, and failover of the file server. Thus, a goal is to reduce the amount of time a file server may require to mount file systems configured on the file server.

Conventionally, one of the mechanisms used to reduce the amount of time required to mount every file system of a file server includes reducing the number of I/O operations that occur during a mount process. Further, conventionally, a second mechanism which is used to reduce the amount of time required to mount every file system of a file server includes executing different phases of a mount process concurrently with each other. Further, a third mechanism which is used to reduce the amount of time required to mount every file system of a file server includes mounting multiple file systems concurrently. Each of the conventional mechanisms described above herein improves availability of a file server by a small percentage. However, each of these conventional mechanisms requires a specific set of file systems to be mounted completely before enabling access to a user. Thus, each of the conventional mechanisms described above herein is unable to scale efficiently when a file server includes a large amount of file systems. One such conventional mechanism is described in co-pending U.S. patent application Ser. No. 13/170,827 for "Managing Initialization of File Systems" filed Jun. 28, 2011, which is incorporated herein by reference.

By contrast, in at least some implementations in accordance with the current technique as described herein, the use of the managing mounting of file systems can provide one or more of the following advantages: reducing an amount of time a file server takes to reboot a data processor by providing access to a file system before every file system configured on the file server is mounted, reducing an amount of down time during a failover of a data processor of a file server by providing access to file systems as soon as the file systems are exported, and reducing a wait time for clients connected to active file systems by mounting the active file systems before mounting rest of the file systems configured on a file server.

In at least one embodiment of the current technique, a user sending a mount request to mount a file system receives a response immediately upon sending the mount request indicating that the file system has been mounted while a file server mounts the file system in background. Thus, in at least one embodiment of the current technique, mounting a large number of file systems requires a least amount of time because processing associated with mounting the file systems occur in background. Further, in at least one embodiment of the current technique, a large number of file systems may be mounted instantaneously or in a least amount of time in a file server in such a way that background processes mounts the file systems based on respective priorities of each of the file systems and/or access pattern of each of the file systems. Additionally, in at least one embodiment of the current technique, file systems are added in a queue by one or more background processes that mounts the file systems such that when a file system residing on the queue is accessed by a user before the file system is successfully mounted by a background process, the priority for mounting the file system is updated to mount the file system in response to the user request to access the file system. Further, in such a case, a request to access a file system by a user remains pending until the time the file system is mounted successfully by a background process. Thus, in at least one embodiment of the current technique, a mount completion status is provided to a user sending a request to mount a file system before the file system is actually mounted by a background process thereby enabling a file server to complete mounting of a large number of file systems in a least amount of time which reduces the amount of time required to reboot the file server, failover of a data processor within the file server, upgrade a system software of the file server, and perform file system operations. Further, mounting of file systems is managed in background by using a pending mount queue in such a way that priority of mounting a file system is updated based on a policy such as an access pattern of the file system without having to change semantics of mounting and accessing a file system visible to a user and applications using the file system.

Thus, in at least one storage system implementation of the current technique as described below, when a data processor of a data storage system such as a file server is initialized during a failover process or a reboot process, a client connected to the file server may access a file system before the file system is mounted thereby reducing an amount of time the client may lose access to data during the failover or reboot of the data processor because the client may no longer need to wait for mounting of every file system of the file server.

Figure 1:
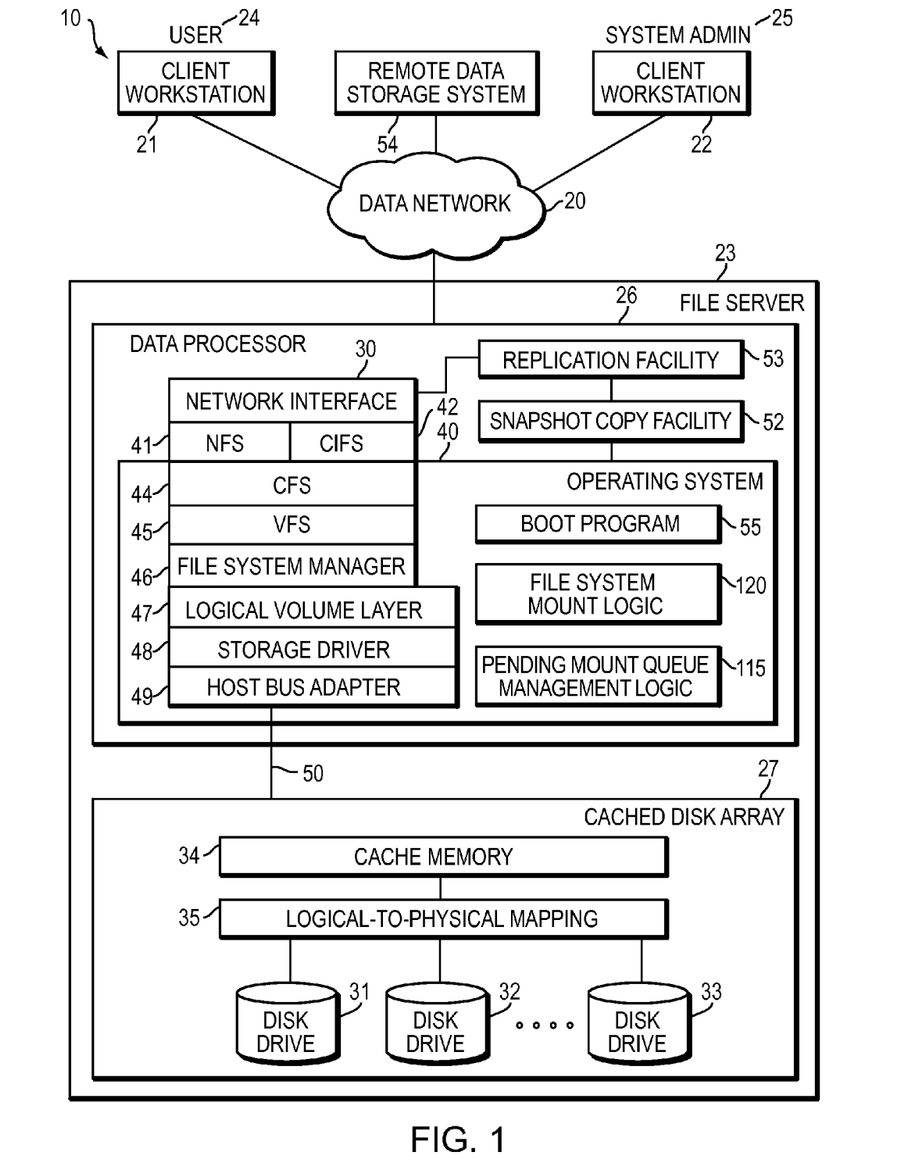
FIGS. 1-2 are an example of an embodiment of a computer system that may utilize the techniques described herein.

Referring now to FIG. 1, shown is an example of an embodiment of a data storage system that may be used in connection with performing the technique or techniques described herein. The data storage system 10 includes a data network 20 interconnecting clients 21, 22 and servers such as a network file server 23 (also referred to simply as "file server") and a remote data storage system 54. The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 27. The data processor 26, for example, is a commodity computer. The cached disk array 27 includes multiple disk drives 31, 32, 33, a high-speed random-access cache memory 34, and logical-to-physical mapping 35 between the cache memory 34 and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume manager module 47. Each logical volume maps to contiguous logical storage addresses in the cached disk array 27. The logical volume manager module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 27.

Referring again to FIG. 1, the CFS module 44, the VFS module 45, the file system manager 46, the logical volume manager 47, and the storage driver 48 are modules of an operating system program 40. The NFS module 41, and CIFS module 42 are internal application programs supported by the operating system 40. The data processor 26 is programmed with additional internal application programs including a snapshot copy facility 52, and a replication facility 53.

The snapshot copy facility 52 performs a copy-on-first-write to each block in a production volume, in order to save an old version ("before image") of the changed block in a snapshot volume. The replication facility 53, for example, replicates, to the remote data storage system 54, changes between a most recent snapshot copy and the next-most-recent snapshot copy of the production volume. Details regarding such a snapshot copy facility 52 and a replication facility 53 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30. 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 20 may be any one or more of a variety of networks or other type of communication connections as known to those skilled in the art. For example, the data network 20 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 1, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single data storage system may be accessed by multiple clients allowing the multiple clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

In at least one embodiment of the current technique, operating system 40 of data processor 26 includes boot program 55, file system mount logic 120, and pending mount queue management logic 115. Boot program 55 is invoked when a sequence of program execution by the data processor 26 is reset. For example, the data processor 26 is responsive to a hardware reset input line triggered by a watchdog timer circuit or a reset push-button switch on a front panel of the data processor. When the hardware reset input line is triggered, an instruction counter of the data processor is loaded with a reset vector address pre-programmed in firmware. The reset vector address is the starting address of the boot program. The data processor 26 can also be reset in response to a user-initiated command or in response to a software bug. For example, a software bug may cause an attempt to execute an illegal instruction or to access protected memory, and the processor is reset in response to the illegal instruction or memory access fault. Boot program 55 reads a boot configuration file and initializes bootable objects included in the boot configuration by executing commands associated with the bootable objects. Data processor 26 is ready for clients 21, 22 to execute applications and access data when boot program 55 finishes execution of the boot configuration file. In at least one embodiment of the current technique, pending mount queue management logic 115 working in conjunction with file system mount logic 120 may responds to mount requests to mount file systems immediately while completing the mount requests in background by mounting the file systems by one or more background processes.

Figure 2:
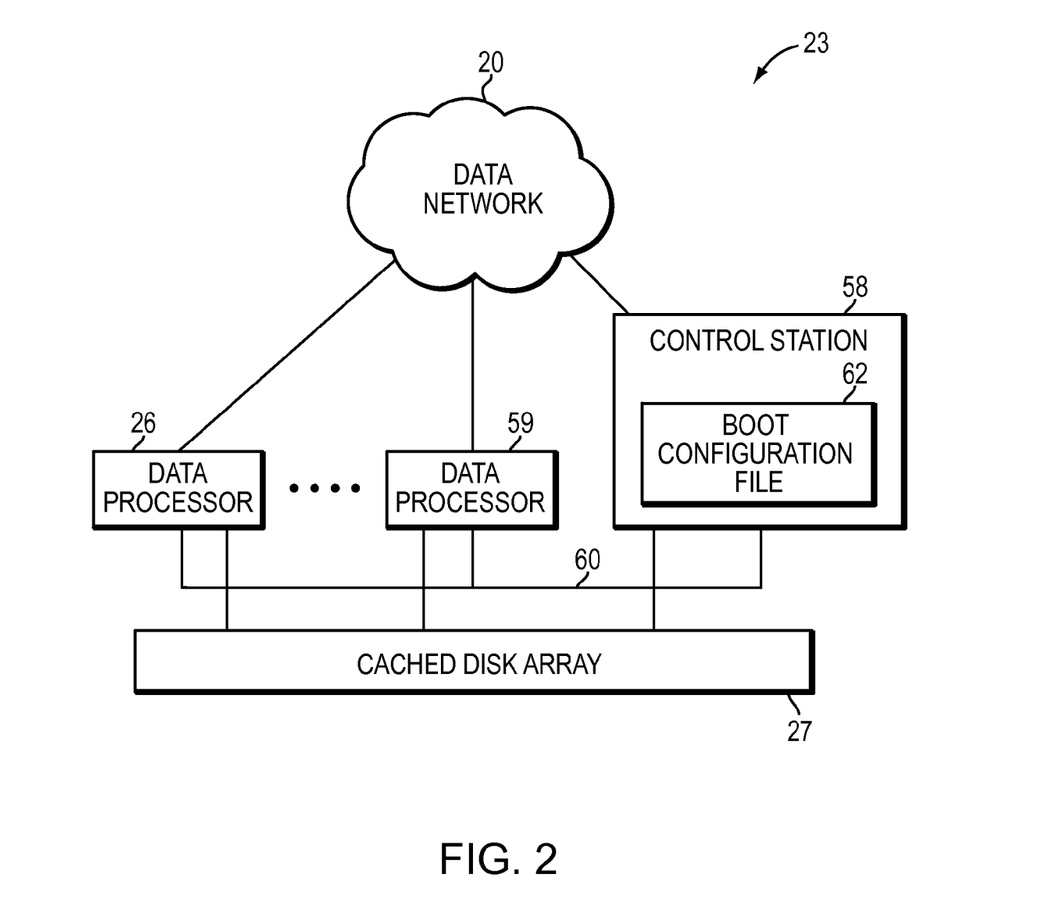

Referring now to FIG. 2, shown is the network file server 23 of FIG. 1 that may further include control station 58 and additional data processors (such as data processor 59) sharing cached disk array 27. A dual-redundant data link 60 interconnects the data processors 26, 59 to the control station 58. The control station 58 monitors a heartbeat signal from each of the data processors 28, 59 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23. The control station 58 also provides certain server configuration information to the data processors 26, 59. For example, the control station maintains boot configuration file 70 (also referred to as "Boot.Config file") accessed by each data processor 26, 59 when the data processor is reset.

Figure 3:
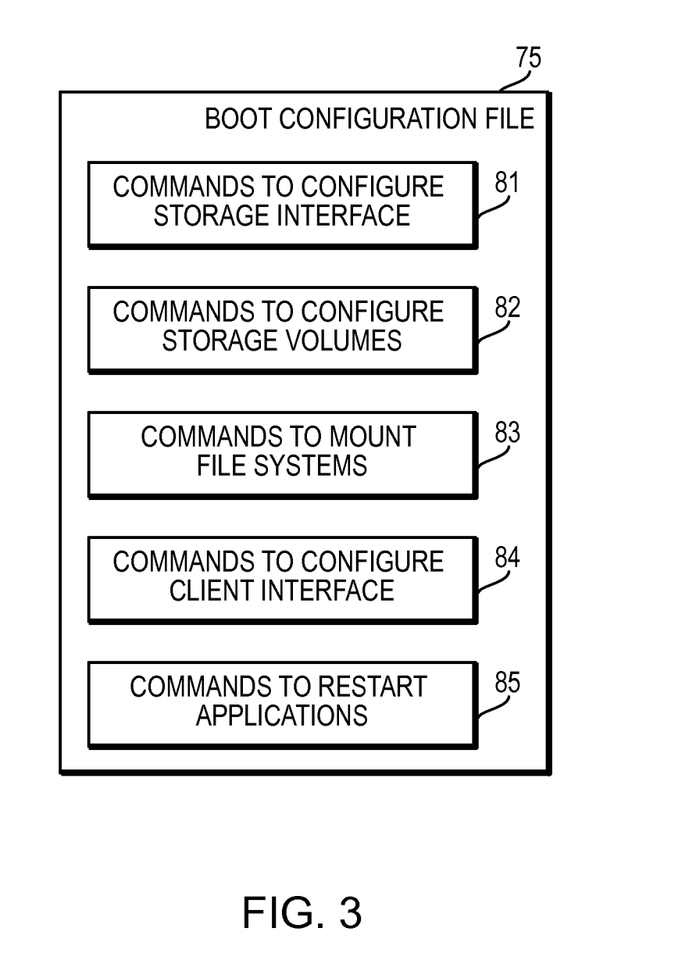
FIGS. 3-4 are block diagrams illustrating in more detail components that may be used in connection with techniques herein.

Referring to FIG. 3, shown is a block diagram of a boot configuration file 75 that is used in at least some embodiments in managing mounting of file systems in a data storage system in accordance with the current technique. With reference also to FIGS. 1 and 2, commands included in the boot configuration file 75 may be categorized in at least five groups. The first group 81 includes commands to configure an interface to a storage device. The second group 82 includes commands to configure logical storage volumes created on the storage device. The third group 83 includes commands to mount file systems created from storage volumes. The fourth group 84 includes commands to configure a client interface for a client connected to file server 23. The fifth group 85 includes commands to restart applications executing on file server 23. Boot program 55 executes the commands included in the boot configuration file 75 in order to configure the interfaces of the data processor 26 to the cached disk array 27, as specified by the commands 81. Then the boot program 55 configures the logical storage volumes of the storage device specified by the commands 82. Then the boot program 55 mounts the file systems specified by the commands 83, and executes export commands for each file system mount command specified in the boot configuration file 70. Then the boot program 55 configures network interfaces of the data processor 26 as specified by the commands 84. Then the boot program 55 initiates execution of application programs as specified by the commands 85.

Figure 4:
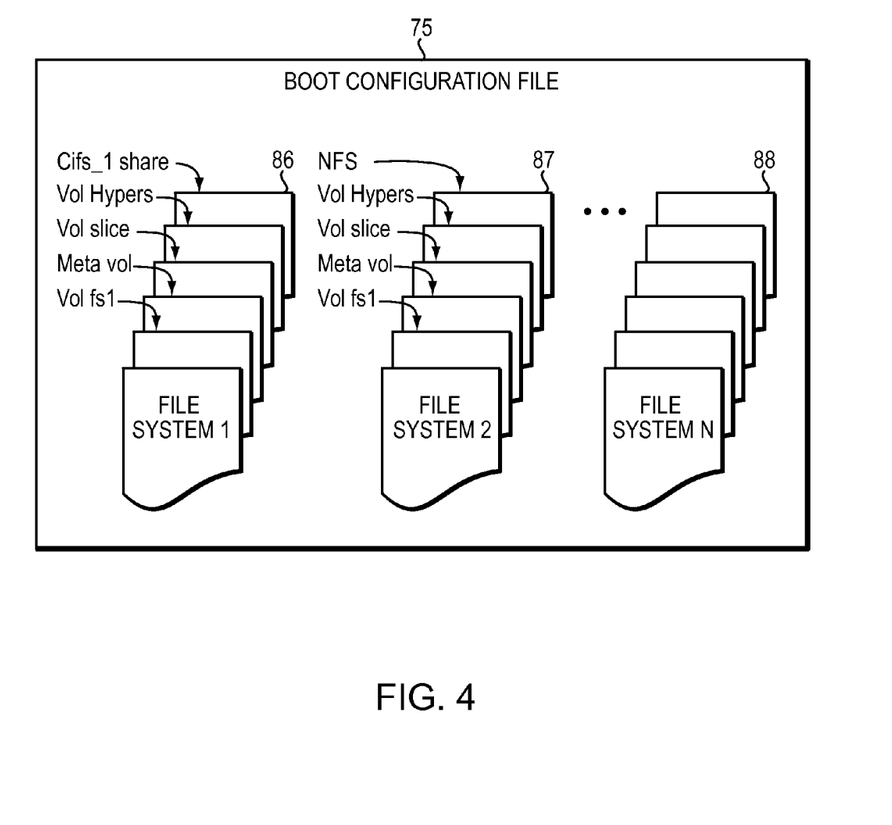

Referring to FIG. 4, shown is a diagram illustrating an example of a boot configuration file in a file server. With reference also to FIGS. 1, 2 and 3, boot configuration file 75 includes bootable objects associated with file systems (e.g., file systems-1 86, file system-2 87, file system-N 88, file systems 3 to (N−1) are not shown in FIG. 4). As shown in FIG. 4, for example, requests to mount file systems 86, 87, 88 received from commands included in boot configuration file 75 are responded to immediately even though the files systems 86-88 are mounted in background such that users may view the file systems 86-88 as mounted and are able to access the file systems 86-88. In at least one embodiment of the current technique, clients of file server 23 may access file systems 86-88 as soon as requests to mount the file systems 86-88 are responded to by the file server 23. As a result, as shown in the example of FIG. 4, an amount of time the clients may need to wait before accessing file systems is reduced significantly as the clients do not have to wait for each file system to be actually mounted.

Figure 5:
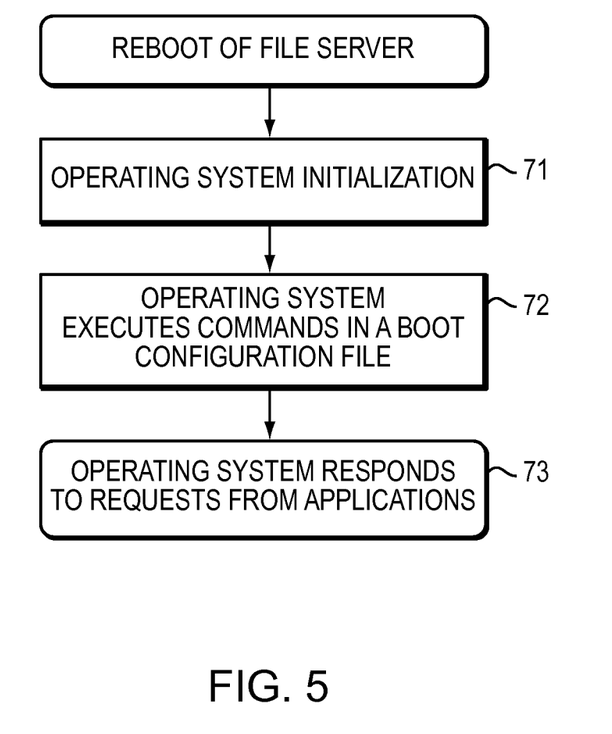
FIG. 5 is a flow diagram illustrating processes that may be used in connection with techniques herein.

Referring to FIG. 5, shown is a flow diagram illustrating the method of initializing an operating system of a data processor in a file server. With reference also to FIGS. 1-4, boot program 55 includes initialization of the operating system 40 of file server 23 (step 71). Boot program 55 of operating system 40 executes each command included in boot configuration file 75 (e.g. "Boot.Config" file) (step 72). In at least one embodiment of the current technique, a command to mount a file system is responded to by file server 23 successfully while the file system is mounted in background. Finally, the operating system 40 responds to requests from internal applications in the file server 23 and clients 21, 22 of the file server 23 (step 73).

Figure 6:
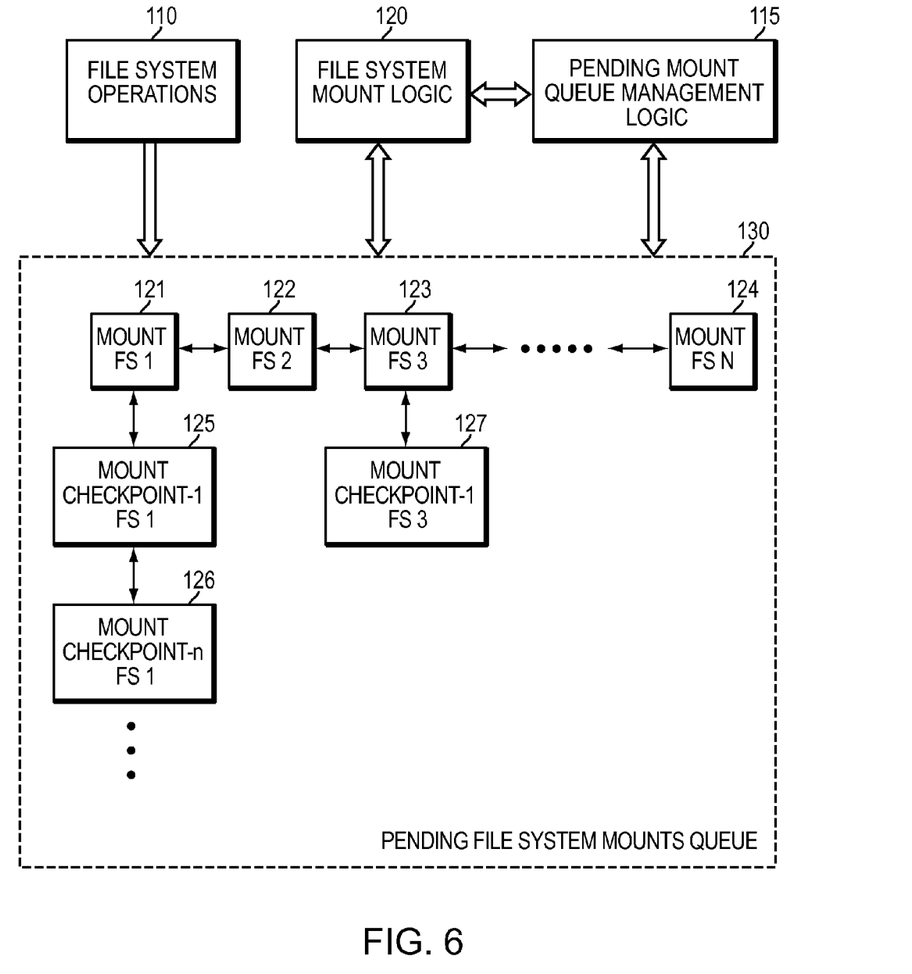
FIG. 6 is a diagram illustrating in more detail components that may be used in connection with techniques herein.

Referring to FIG. 6, shown is a more detailed representation of components that may be included in an embodiment using the techniques described herein. In at least one embodiment of the current technique, file system mount logic 120 works in conjunction with pending mount queue management logic to mount file systems in background while responding to mount requests by a user to mount the file systems instantaneously. For example, in at least one embodiment of the current technique, file server 23 may receive a request to mount file systems FS-1, FS-2, FS-3 and FS-N (other file systems not shown). A request to mount a file system may be received from boot configuration file 75. Further, a request to mount a file system may also be received as a result of a file system operation 110 performed by a user and/or storage system. Upon receiving a mount request, file server 23 responds to the mount request immediately and provides the status indicating that the mount has been completed without having to actually mount the file system such that a large number of mount requests may be responded to a least amount of time. In such a case, a file system is then mounted in background. When file server 23 receives a request to mount a file systems, file system mount logic 120 adds the mount request to pending file system mounts queue 130 such that the file system may be mounted in background by pending mount queue management logic 115. For example, as shown in FIG. 6, requests to mount FS-1 121, FS-2 122, FS-3 123 and FS-N 124 are added to pending file system mounts queue 130. Thus, in at least one embodiment of the current technique, a file server is initialized for use by a user even when every file system configured on the file server is not mounted such that when the user attempts to access a file system, the file system is mounted at that time if the file system has not been mounted already by a background process during initialization. Therefore, an amount of time a client and/or a user has to wait during the failover or reboot of data processor 26 is reduced when the client is able to access a file system before every file system configured in boot configuration file 75 of file server 23 is actually mounted. In at least one embodiment of the current technique, file server 23 is initialized and is ready for use by a user after adding requests to mount file systems configured on the file server 23 in a queue which is processed in background. During background processing of the queue, one or more processes (also referred to herein as "threads") may mount one or more file systems concurrently. Further, in at least one embodiment of the current technique, a request to export a file system is completed even though the file system is not mounted such that the file system is visible to a user upon completion of the export request. In such a case, when the user attempts to access the file system which has not been mounted yet, the file system is mounted upon receiving the request to access the file system.

In at least one embodiment of the current technique, requests to mount file systems may be added to a queue such as pending file system mounts queue 130 in an order in which the requests appear in boot configuration file 75. Further, in at least another embodiment of the current technique, requests to mount file systems may be added to pending file system mounts queue 130 in an order based on a policy which may be based on an access time of a file system such that a file system which has been active prior to shutdown or failover of a storage system is mounted prior to file systems that have not been active. Further, it should be noted that requests to mount file systems may be added to pending file system mounts queue 130 in an order based on a policy which is based on a specific criterion such as the type of applications (e.g., replication) that are waiting to access a file system.

Further, in at least one embodiment of the current technique, file system services (also referred to herein as "applications") such as mounting of a checkpoint of a file system, a mountpoint of the file system, a snapshot copy of the file system, and a replica of the file system that depends on successful mount of the file system are added to pending file system mounts queue 130 along with the request to mount the file system. For example, as shown in FIG. 6, requests to mount checkpoints (e.g. checkpoint-1 125, checkpoint-n 126) of file system FS-1 121 are added to pending file system mounts queue 130 and are associated with the mount request for file system FS-1 121 such that checkpoints 125, 126 of file system FS-1 121 are mounted by file system mount logic 120 after the file system FS-1 121 is mounted successfully. Similarly, requests to mount a checkpoint (e.g. checkpoint-1 127) of file system 123 FS-3 is added to pending file system mounts queue 130 and is associated with the mount request for file system FS-3 123. Further, in at least one embodiment of the current technique, a request to mount a checkpoint of a file system may be added to a dependency list for mount request for the file system residing in pending file system mounts queue 130 such that the mount request for mounting a checkpoint of a primary file system is added as a dependency graph tree to the mount request for the primary file system.

Further, in at least one embodiment of the current technique, if a file system which has been added to pending file system mounts queue 130 and has not been mounted yet is accessed by a user and/or application, the file system is given a high priority within pending file system mounts queue 130 and is mounted at an earlier time which is different from the time based on the actual order in which the file system is initially added to the pending file system mounts queue 130. Thus, in at least one embodiment of the current technique, requests to mount file systems residing on pending file system mounts queue 130 are reordered dynamically based upon access patterns for the file systems. Further, in at least one embodiment of the current technique, a frozen file system is mounted in such that NFS exports for the frozen file system are completed before snapshot copies of the frozen file system are mounted. Thus, in at least one embodiment of the current technique, requests to mount file systems and export the file systems are processed prior to processing requests to mount checkpoints of the file systems. Further, in order to avoid receiving invalid file handles for checkpoints of file systems that have not been mounted yet, the checkpoints of the file systems are mounted as a "frozen" file systems.

Generally, creating a checkpoint of a primary file system requires the primary file system to be paused. A file system is paused when write I/O requests directed to the primary file system are suspended; however read I/O requests may continue to be processed. Restoring a primary file system from a checkpoint of the primary file system requires the primary file system to be frozen. A file system is frozen when every request directed to the file system is suspended. Thus, every request directed to a primary file system is suspended when a storage system restores the primary file system from a checkpoint of the primary file system. Further, refreshing a checkpoint of a primary file system requires the checkpoint to be frozen indicating that read requests directed to the checkpoint are suspended. Further, deleting a checkpoint of a primary file system requires the primary file system to be paused.

Figure 7:
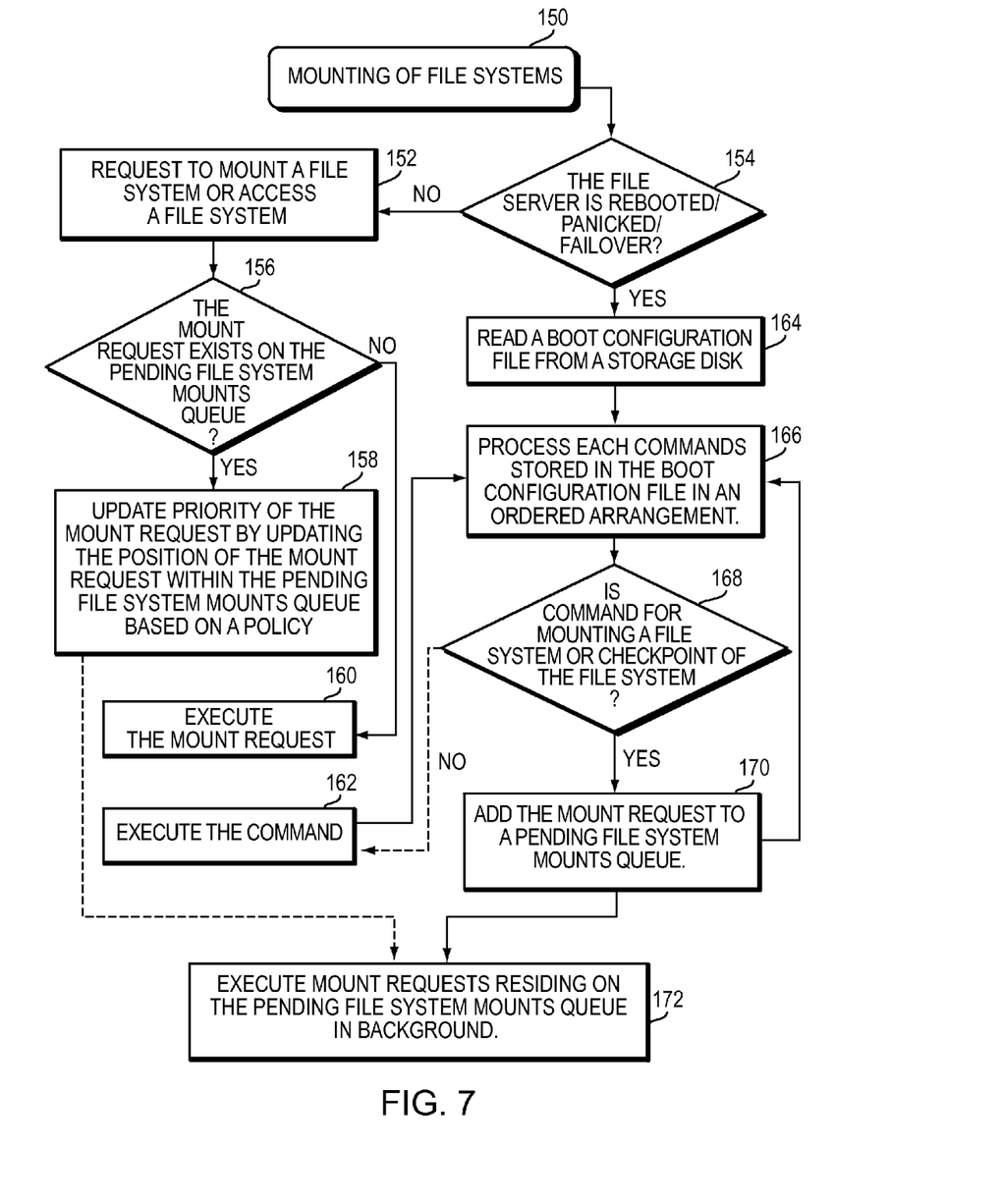
FIG. 7 is a flow diagram illustrating processes that may be used in connection with techniques herein.

Referring to FIG. 7, shown is a flow diagram illustrating an example of the method of managing mounting of file systems in data storage systems. With reference also to FIGS. 1-6, file server 23 mounts a set of file systems (step 150). File systems may be mounted when a boot configuration file for a file server is executed. Further, file systems may be mounted by a user and/or an application. If data processor 26 of file server 23 reboots due to a failure or a failover (step 154), boot configuration file 75 is created from information such as bootable objects stored on a storage disk of file server 23 which is then read and processed by file server 23 (step 164). Boot configuration file 75 is created in an ordered arrangement such that commands to initialize bootable objects associated with file systems included in the boot configuration file 75 are executed based on the ordered arrangement (step 166). During processing of the boot configuration file 75, file server 23 determines whether a command included in the boot configuration file is for mounting a file system or checkpoint of the file system (step 168). If the command is for mounting a file system, file server 23 processes the mount command by adding the request to mount the file system in pending file system mounts queue 130 (step 170). Further, if the command is for mounting a checkpoint of a file system, file server 23 processes the mount command by adding the request to mount the checkpoint of the file system in pending file system mounts queue 130 such that the request to mount the checkpoint is associated with a request to mount the file system. Further, as soon as the command to mount the file system or the checkpoint of the file system is processed in step 170, access to the file system is enabled and clients 21, 22 may access data of the file system. However, if during processing of the boot configuration file 75, file server 23 determines that a command included in the boot configuration file is not for mounting a file system or checkpoint of the file system, the file server 23 executes the command (step 162).

If data processor 26 of file server 23 does not reboot due to a failure or a failover, file server 23 may receive a request to either mount a file system or access the file system which has been initialized through boot configuration file 75 (step 152). File server 23 determines whether the command to mount the file system resides on pending file system mounts queue 130 (step 156). Upon determining that the command to mount the file system resides on pending file system mounts queue 130, the priority of the mount command is updated by moving the mount command towards the start of the pending file system mounts queue 130 (step 158). Further, in at least one embodiment of the current technique, a mount command for a file system resulting from an access of the file system (also referred to as "on-demand mount request") is moved in front of mount commands initially residing on pending file system mounts queue 130 due to mount requests received from boot configuration file 75. Further, in such a case, an on-demand mount request is moved within the pending file system mounts queue 130 based on a specific priority such as the order in which file systems are accessed in order to ensure fairness among mount commands residing on the pending file system mounts queue 130. However, if the command to mount the file system does not reside on pending file system mounts queue 130, the request to mount the file system is executed and the file system is mounted (step 160). Further, file server 23 executes mount commands added to the pending file system mounts queue 130 in background using one or more background processes by mounting file systems associated with each of the mount commands (step 172).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method configured to utilize managing mounting of file systems, the method comprising:
receiving a set of mount requests to mount a set of file systems on a data storage system, the data storage system including a set of disks and a set of processors, each file system of the set of file systems stored on the data storage system, each file system of the set of file systems has a specific mounting priority, wherein a respective mounting priority of a file system of the set of file systems indicates an order in which the file system is mounted;

adding each mount request of the set of mount requests to mount the set of file systems in a pending file system mounts queue in an order based on respective mounting priority of each file system, wherein a respective mounting priority of a file system is dynamically updated based on a policy, the policy based on an access pattern of the file system;

mounting each file system of the set of file systems added to the pending file system mounts queue in background by a background process based on respective mounting priority of each file system; and providing access to each file system of the set of file systems before each file system is mounted by the background process by sending a respective mount completion response for each mount request of the set of mount requests.

2. The method of claim 1, further comprising:
initializing the set of file systems upon execution of a boot configuration file.

3. The method of claim 1, further comprising:
mounting each file system of the set of file systems in background based on a respective mounting priority of the file system.

4. The method of claim 1, further comprising:
receiving a request to access a file system of the set of file systems;
determining whether the file system resides in the pending file system mounts queue; and
based on the determination, updating a respective mounting priority of the file system, wherein updating the respective mounting priority includes moving the request to mount the file system towards the start of the pending file system mounts queue.

5. The method of claim 1, wherein the access pattern of a file system includes a last access time of a file system.

6. The method of claim 1, further comprising:
receiving a request to mount a checkpoint of a file system; and
adding the request to mount the checkpoint of the file system in the pending file system mounts queue, wherein the request to mount the checkpoint of the file system is dependent upon the completion of the request to mount the file system.

7. The method of claim 1, further comprising:
receiving a request to mount a file system from a boot configuration file.

8. The method of claim 1, further comprising:
receiving a request to mount a file system from a user.

9. The method of claim 1, further comprising:
exporting a file system before the file system is mounted.

10. The method of claim 1, further comprising:
providing a status indicating successful completion of a request to mount a file system after adding the request to mount the file system in the pending file system mounts queue.

11. A system configured to utilize managing mounting of file systems, the system comprising a set of disks and a set of processor configured to:
receive a set of mount requests to mount a set of file systems on a data storage system, the data storage system including a set of disks and a set of processors, each file system of the set of file systems stored on the data storage system, each file system of the set of file systems has a specific mounting priority, wherein a respective mounting priority of a file system of the set of file systems indicates an order in which the file system is mounted;

add each mount request of the set of mount requests to mount the set of file systems in a pending file system mounts queue in an order based on respective mounting priority of each file system, wherein a respective mounting priority of a file system is dynamically updated based on a policy, the policy based on an access pattern of the file system;

mount each file system of the set of file systems added to the pending file system mounts queue in background by a background process based on respective mounting priority of each file system; and provide access to each file system of the set of file systems before each file system is mounted by the background process by sending a respective mount completion response for each mount request of the set of mount requests.

12. The system claim 11, further comprising:
initialize the set of file systems execution of a boot configuration file.

13. The system of claim 11, further comprising:
mount each file system of the set of file systems in background based on a respective mounting priority of the file system.

14. The system of claim 11, further comprising:
receive a request to access a file system of the set of file systems;
determine whether the file system resides in the pending file system mounts queue; and
update, based on the determination, a respective mounting priority of the file system, wherein updating the respective mounting priority includes moving the request to mount the file system towards the start of the pending file system mounts queue.

15. The system of claim 11, wherein the access pattern of a file system includes a last access time of a file system.

16. The system of claim 11, further comprising:
receive a request to mount a checkpoint of a file system; and
add the request to mount the checkpoint of the file system in the pending file system mounts queue, wherein the request to mount the checkpoint of the file system is dependent upon the completion of the request to mount the file system.

17. The system of claim 11, further comprising:
receive a request to mount a file system from a boot configuration file.

18. The system of claim 11, further comprising:
receive a request to mount a file system from a user.

19. The system of claim 11, further comprising:
export a file system before the file system is mounted.

20. The system of claim 11, further comprising:
provide a status indicating successful completion of a request to mount a file system after adding the request to mount the file system in the pending file system mounts queue.

* * * * *